United States Patent [19]
Sakamoto

[11] Patent Number: 5,368,363
[45] Date of Patent: Nov. 29, 1994

[54] SEAT RECLINING MECHANISM

[75] Inventor: Daishiro Sakamoto, Ayase, Japan

[73] Assignee: Ikeda Bussan Co., Ltd., Ayase, Japan

[21] Appl. No.: 101,303

[22] Filed: Aug. 3, 1993

[30] Foreign Application Priority Data

Aug. 4, 1992 [JP] Japan .................. 4-208113
Aug. 4, 1992 [JP] Japan .................. 4-208114

[51] Int. Cl.$^5$ ............................. B60N 2/02
[52] U.S. Cl. .................. 297/362; 475/341; 475/346
[58] Field of Search ............... 297/362; 475/162, 170, 475/172, 341, 346

[56] References Cited

U.S. PATENT DOCUMENTS 4,211,451 7/1980 Shephard ............. 475/346
5,183,447 2/1993 Kawakita ............. 475/341

FOREIGN PATENT DOCUMENTS 3729134 3/1989 Germany .
3-000847 1/1991 Japan .
2234550 2/1991 United Kingdom .
2248481 4/1992 United Kingdom .

Primary Examiner—John T. Kwon
Attorney, Agent, or Firm—Foley & Lardner

[57] ABSTRACT

A seat reclining mechanism for adjusting the angular position of a seatback relative to a seat cushion by a planetary gear arrangement includes a rotatable shaft, a base plate, a pivotable arm, a control gear, a plurality of planetary gears, and a supporting member. Each planetary gear has a first boss portion. The supporting member has first and second circular holes for receiving therein the first boss portions of the planetary gears. The first and second circular holes are disposed on the supporting member such that a first distance between a rotational center of the supporting member and a rotational center of the first circular hole is shorter than a second distance between the rotational center of the supporting member and a rotational center of the second circular hole. The supporting member has a circular center hole. The pivotable arm has a second boss portion which is received in the circular center hole of the supporting member for mounting the supporting member on the second boss portion.

10 Claims, 2 Drawing Sheets

5,368,363

SEAT RECLINING MECHANISM

BACKGROUND OF THE INVENTION

1. Field of the Invention

The present invention relates in general to a seat reclining mechanism, and more particularly to a seat reclining mechanism for adjusting the angular position of a seatback relative to a seat cushion by a planetary gear arrangement.

2. Description of the Prior Art

Japanese Utility Model First Provisional Publication 3-847 discloses a seat reclining mechanism comprising a base plate, a pivotable arm, a rotatable shaft, a control gear, a plurality of planetary gears and a pair of supporting plates. Each supporting plate has three circular holes for receiving therein boss portions of the planetary gears. All the three circular holes are equidistantly spaced from the center of the supporting plate in a radial direction thereof. Each supporting plate is fitted into a cylindrical recess formed on the base plate or the pivotable arm in a manner that the supporting plate can rotate within the cylindrical recess. Thus, the supporting plate is positioned by fitting the supporting plate into the cylindrical recess. However, this seat reclining mechanism has the following drawbacks.

If play between the planetary gears and ring gears of the base plate and of the pivotable arm exceeds a certain allowable range, for example, it is necessary to replace the planetary gears by new ones which are larger in size. This increases the production cost. When the rotatable shaft is rotated, each planetary gear revolves on its axis and round the control gear. Due to this, each supporting plate is rotated on its own axis under the condition that a peripheral cylindrical surface of the supporting plate is in abutment with a cylindrical surface of the recess. Therefore, each supporting plate can not rotate smoothly and durability of the same is not satisfactory.

SUMMARY OF THE INVENTION

It is therefore an object of the present invention to provide a seat reclining mechanism in which play between planetary gears and ring gears can be easily adjusted.

It is another object of the present invention to provide a seat reclining mechanism in which durability of a supporting plate is improved.

According to a first aspect of the present invention, there is provided a seat reclining mechanism including:

a rotatable shaft;

a base plate which has a first through hole for receiving said rotatable shaft therein, said base plate having at a major surface thereof a first cylindrical recess which is coaxial with said rotatable shaft, said base plate having a first ring gear at a cylindrical surface defined by said first cylindrical recess;

a pivotable arm which is rotatably connected to said base plate through said rotatable shaft, said pivotable arm having a second through hole for receiving said rotatable shaft therein, said second through hole being in alignment with said first through hole, said pivotable arm having at a major surface thereof a second cylindrical recess which is merged with said first cylindrical recess so as to define a space between said base plate and said pivotable arm, said second cylindrical recess being coaxial with said rotatable shaft, said pivotable arm having at a cylindrical surface defined by said second cylindrical recess a second ring gear;

a third cylindrical recess which is formed on one of said base plate and said pivotable arm, said third cylindrical recess being merged with one of said first and second cylindrical recesses and being coaxial with said rotatable shaft;

a control gear securely and coaxially mounted on said rotatable shaft, said control gear being received in said space:

a planetary gear which has a toothed portion received in said space and a first boss portion formed on a rotational center thereof, said toothed portion being meshed with said first and second ring gears and said control gear, said first boss portion being received in said third cylindrical recess; and a supporting member received in said third cylindrical recess, said supporting member being coaxial with said rotatable shaft, said supporting member having first and second circular holes for rotatably receiving therein said first boss portion, said first and second circular holes being disposed on said supporting member such that a first distance between a rotational center of said supporting member and a rotational center of said first circular hole is shorter than a second distance between said rotational center of said supporting member and a rotational center of said second circular hole.

According to a second aspect of the present invention, there is provided a seat reclining mechanism including:

a rotatable shaft;

a base plate which has a first through hole for receiving said rotatable shaft therein, said base plate having at a major surface thereof a first cylindrical recess which is coaxial with said rotatable shaft, said base plate having a first ring gear at a cylindrical surface defined by said first cylindrical recess;

a pivotable arm which is rotatably connected to said base plate through said rotatable shaft, said pivotable arm having a second through hole for receiving said rotatable shaft therein, said second through hole being in alignment with said first through hole, said pivotable arm having at a major surface thereof a second cylindrical recess which is merged with said first cylindrical recess so as to define a space between said base plate and said pivotable arm, said second cylindrical recess being coaxial with said rotatable shaft, said pivotable arm having at a cylindrical surface defined by said second cylindrical recess a second ring gear;

a third cylindrical recess which is formed on one of said base plate and said pivotable arm, said third cylindrical recess being merged with one of said first and second cylindrical recesses and being coaxial with said rotatable shaft;

a control gear securely and coaxially mounted on said rotatable shaft, said control gear being received in said space;

a planetary gear which has a toothed portion received in said space and a first boss portion formed on a rotational center thereof, said toothed portion being meshed with said first and second ring gears and said control gear, said first boss portion being received in said third cylindrical recess;

a supporting member for supporting said first boss portion of said planetary gear, said supporting member being received in said third cylindrical recess and being coaxial with said rotatable shaft, said supporting member having a circular center hole at a center thereof; and a second boss portion formed on one of said base plate and said pivotable arm, said second boss portion being disposed within said third cylindrical recess and being coaxial with said rotatable shaft, said second boss portion being received in said circular center hole of said supporting member for rotatably mounting said supporting member on said second boss portion.

DESCRIPTION OF THE PREFERRED INVENTION

Referring to FIGS. 1 to 4, a seat reclining mechanism according to the present invention will be described in the following.

As is known, a seatback (not shown) of a seat (not shown) is rotated to a desired angular position relative to a seat cushion (not shown) of the seat through the seat reclining mechanism.

Figure 1:
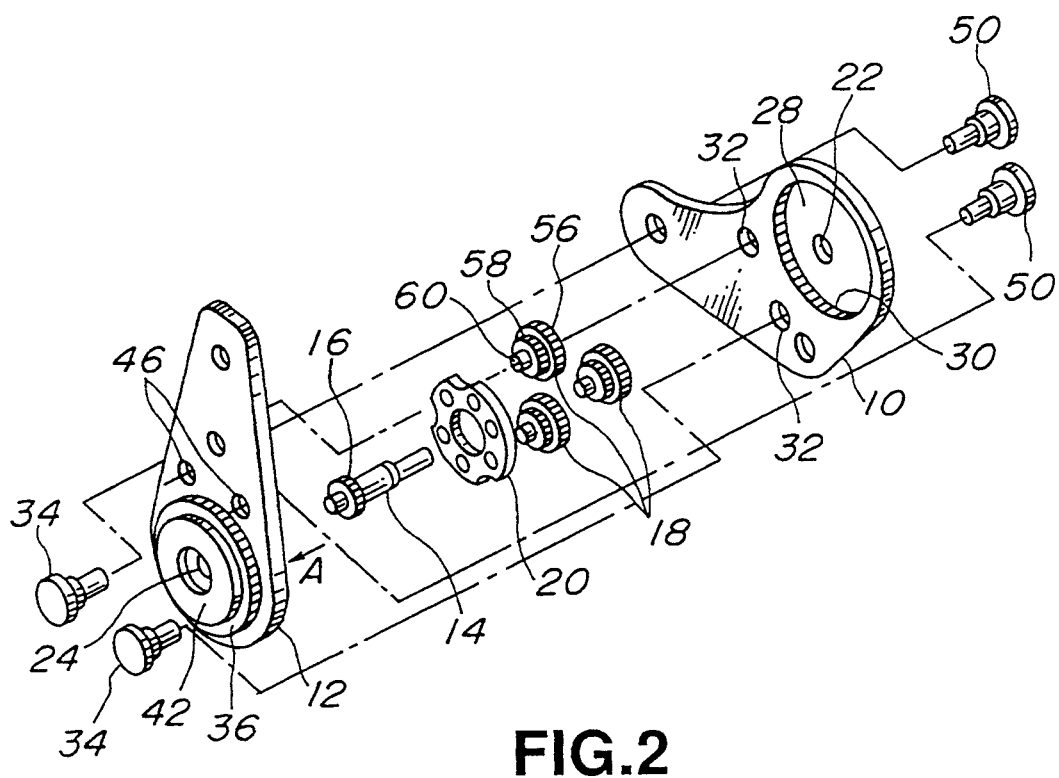
FIG. 1 is an exploded perspective view of a seat reclining mechanism according to the present invention.
Figure 2:
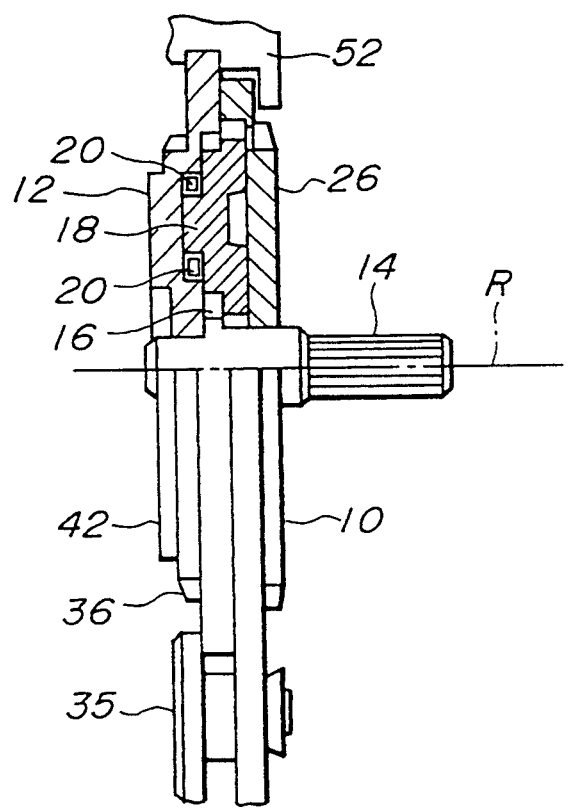
FIG. 2 is an enlarged rear, partly sectional, view of the seat reclining mechanism.

As is seen from FIG. 1, the seat reclining mechanism comprises a base plate 10, a pivotable arm 12, a rotatable shaft 14, a control gear 16, a plurality of planetary gears 18 (three planetary gears in this embodiment) and a supporting plate 20.

The base plate 10 and the pivotable arm 12 are respectively formed with circular through holes 22 and 24 which are horizontally aligned with each other for receiving the rotatable shaft 14 therein. Thus, the rotatable shaft 14 is rotatably held by the base plate 10 and the pivotable arm 12. As will be clarified as the description proceeds, the pivotable arm 12 rotates slowly about a rotational axis "R" of the rotatable shaft 14 by the rotation of the rotatable shaft 14 (see FIG. 2). To rotate the rotatable shaft 14, for example, a manual control lever (not shown) can be fixed to the rotatable shaft 14 or an electric motor (not shown) can be operatively connected to the rotatable shaft 14.

The base plate 10 is formed at its outer surface with a boss portion 26 defining a cylindrical space 28 at its inner surface. The cylindrical space 28 is disposed about the rotational axis "R" of the rotatable shaft 14. The base plate 10 is formed at a cylindrical surface defined by the cylindrical space 28 with a first ring gear 30. The base plate 10 is formed with fixing holes 32 for receiving therein bolts 34. The base plate 10 is secured to a seat cushion frame 35 through the bolts 34.

Figure 3:
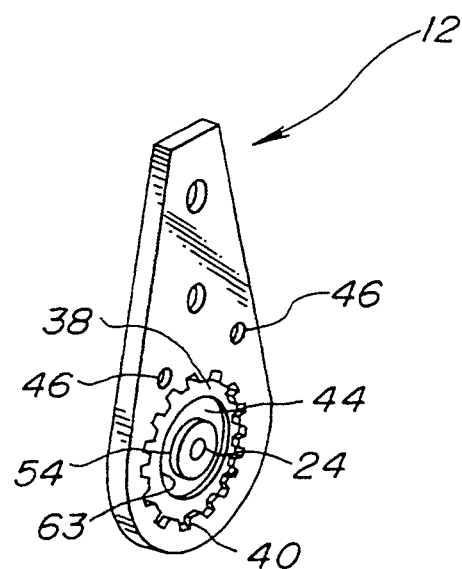
FIG. 3 is a perspective view of a pivotable arm of the seat reclining mechanism, which is viewed from a direction of "A" of FIG. 1.

As is seen from FIGS. 1 and 3, the pivotable arm 12 is formed at its outer surface with a first boss portion 36 defining a cylindrical space 38 at its inner surface. The pivotable arm 12 is formed at a cylindrical surface defined by the cylindrical space 38 with a second ring gear 40. The second ring gear 40 has a certain number of teeth which is different from that of the first ring gear 30 by a certain predetermined number so as to obtain a certain predetermined speed reduction ratio. The pivotable arm 12 is further formed at its outer surface with a second boss portion 42 defining an annular space 44 at its inner surface. The pivotable arm 12 is formed with fixing holes 46 for receiving therein bolts 50. The pivotable arm 12 is secured to a seatback frame 52 through the bolts 50. The pivotable arm 12 is further formed at its inner surface with a third boss portion 54. The cylindrical space 38, the annular space 44 and the first, second and third boss portions 36, 42 and 54 of the pivotable arm 12 are disposed about the rotational axis "R" of the rotatable shaft 14.

The control gear 16 is monolithically mounted on the rotatable shaft 14 so as to be coaxial therewith.

Each planetary gear 18 is formed with large and small toothed portions 56 and 58 and a cylindrical boss portion 60 which is disposed about a rotational axis (not shown) thereof. Each planetary gear 18 is meshed at the small toothed portion 58 with the control gear 16. Each planetary gear 18 is also meshed at the large and small toothed portions 56 and 58 with the first and second ring gears 30 and 40, respectively.

Figure 4:
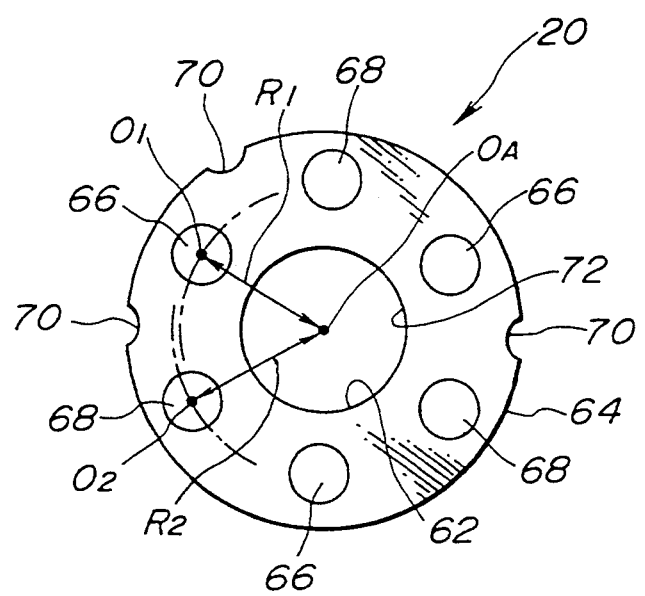
FIG. 4 is a plan view of a supporting plate of the seat reclining mechanism.

As is seen from FIG. 4, the supporting plate 20 is annular in shape and has a circular through hole 62 at its center for receiving therein the third boss portion 54 of the pivotable arm 12. The circular through hole 62 is sized such that the supporting plate 20 is rotatably mounted on the third boss portion 54 of the pivotable arm 1.2. The outer diameter of the supporting plate 20 is sized such that there is provided a certain clearance between an outer cylindrical surface 63 defined by the annular space 44 and an outer cylindrical surface 64 of the supporting plate 20. The supporting plate 20 is alternately formed with first and second supporting holes 66 and 68 in a circumferential direction thereof for receiving therein the cylindrical boss portions 60 of the planetary gears 18. Each first supporting hole 66 is disposed in a so-called standard position with respect to a radial direction of the supporting plate 20 such that the distance between a rotational center $O_A$ of the supporting plate 20 and a rotational center $O_1$ of the first supporting hole 66 is $R_1$. Each second supporting hole 68 is disposed in a certain position with respect to a radial direction of the supporting plate 20 such that the distance between the rotational center $O_A$ of the supporting plate 20 and a rotational center $O_2$ of the second supporting hole 68 is $R_2$. In view of the production error of the planetary gears 18 and of the supporting plate 20, the distance $R_2$ is designed to be slightly finely longer than the distance $R_1$, as illustrated. That is, each second supporting hole 68 is more outwardly disposed with respect to a radial direction of the supporting plate 20 as compared with each first supporting hole 66. Therefore, if play or backlash between planetary gears 18 and the first and second ring gears 30 and 40 exceeds a certain allowable range due to the production error or abrasion of the parts under the condition that the cylindrical boss portions 60 of planetary gears 18 are received in the first supporting holes 68 of the supporting plate 20, the cylindrical boss portions 60 can be pulled out from the first supporting holes 66 and then inserted into the second supporting holes 68, thereby decreasing the play. Thus, according to the present invention, it is not necessary to replace the planetary gears 18 by new ones for decreasing the play. Therefore, the production cost can be reduced. The supporting plate is further formed at its periphery with notches 70 which are asymmetrically disposed in a circumferential direction of the supporting plate 20 for identifying the positions of the first and second supporting holes 66 and 68.

In operation, when the rotatable shaft 14 is rotated, the control gear 16 is integrally rotated therewith. With this, each planetary gear 18 revolves on its own axis and, at the same time, round the control gear 16. Since the ring gears 30 and 40 have a different number of teeth, the rotation of the planetary gears 18 causes rotation of the ring gear 40 relative to the ring gear 30. Therefore, a small angular movement of the pivotable arm 12 is effected. Thus, the seatback pivots slowly in a forward or rearward direction relative to the seat cushion. Due to the rotation of the planetary gears 18 round the control gear 16, the supporting plate 20 is also rotated on its own axis under the condition that an inner cylindrical surface 72 of the supporting plate 20 is in abutment with an outer cylindrical surface of the third boss portion 54 while maintaining a certain clearance between the outer cylindrical surface 64 of the supporting plate 20 and the outer cylindrical surface 63 defined by the annular space 44 of the pivotable arm 12. Therefore, the supporting plate 20 can be more smoothly rotated and durability of the same is improved in the present invention as compared with the above-mentioned conventional seat reclining mechanism. Therefore, according to the present invention, torque to be applied to the rotatable shaft 14 can be reduced.

According to the above-mentioned embodiment of the present invention, the annular space 44 and the third boss portion 54 are formed on the pivotable arm 12. However, if desired, they may be formed on the base plate 10.

According to the embodiment, only the first and second supporting holes 66 and 68 are formed on the supporting plate 20. However, if desired, more than two types of the supporting holes may be formed on the supporting plate 20.

What is claimed is:

1. A seat reclining mechanism comprising:
   a rotatable shaft;
   a base plate which has a first through hole for receiving said rotatable shaft therein, said base plate having at a major surface thereof a first cylindrical recess which is coaxial with said rotatable shaft, said base plate having a first ring gear at a cylindrical surface defined by said first cylindrical recess;
   a pivotable arm which is rotatably connected to said ,base plate through said rotatable shaft, said pivotable arm having a second through hole for receiving said rotatable shaft therein, said second through hole being in alignment with said first through hole, said pivotable arm having at a major surface thereof a second cylindrical recess which is merged with said first cylindrical recess so as to define a space between said base plate and said pivotable arm, said second cylindrical recess being coaxial with said rotatable shaft, said pivotable arm having at a cylindrical surface defined by said second cylindrical recess a second ring gear;
   a third cylindrical recess which is formed on one of said base plate and said pivotable arm, said third cylindrical recess being merged with one of said first and second cylindrical recesses and being coaxial with said rotatable shaft;
   a control gear securely and coaxially mounted on said rotatable shaft, said control gear being received in said space;
   a planetary gear which has a toothed portion received in said space and a first boss portion formed on a rotational center thereof, said toothed portion being meshed with said first and second ring gears and said control gear, said first boss portion being received in said third cylindrical recess; and
   a supporting member received in said third cylindrical recess, said supporting member being coaxial with said rotatable shaft, said supporting member having first and second circular holes for rotatably receiving therein said first boss portion, said first and second circular holes being disposed on said supporting member such that a first distance between a rotational center of said supporting member and a rotational center of said first circular hole is shorter than a second distance between said rotational center of said supporting member and a rotational center of said second circular hole.

2. A seat reclining mechanism as claimed in claim 1, in which said supporting member is formed at a periphery thereof with a plurality of notches which are asymmetrically disposed for identifying positions of said first and second circular holes.

3. A seat reclining mechanism as claimed in claim 1, in which said toothed portion of said planetary gear comprises a first toothed portion and a second toothed portion which is smaller than said first toothed portion in size, said first and second toothed portions being respectively meshed with said first and second ring gears.

4. A seat reclining mechanism as claimed in claim 1, in which said supporting member has a circular center hole at a center thereof.

5. A seat reclining mechanism as claimed in claim 4, in which one of said base plate and said pivotable arm has a second boss portion which is disposed within said third cylindrical recess, said second boss portion being received in said circular center hole of said supporting member for rotatably mounting said supporting member on one of said base plate and said pivotable arm.

6. A seat reclining mechanism as claimed in claim 1, in which said supporting member is sized so as to have a certain clearance between a cylindrical outer surface defined by said third cylindrical recess and a peripheral cylindrical surface of said supporting member.

7. A seat reclining mechanism comprising:
   a rotatable shaft;
   a base plate which has a first through hole for receiving said rotatable shaft therein, said base plate having at a major surface thereof a first cylindrical recess which is coaxial with said rotatable shaft, said base plate having a first ring gear at a cylindrical surface defined by said first cylindrical recess;
   a pivotable arm which is rotatably connected to said base plate through said rotatable shaft, said pivotable arm having a second through hole for receiving said rotatable shaft therein, said second through hole being in alignment with said first through hole, said pivotable arm having at a major surface thereof a second cylindrical recess which is merged with said first cylindrical recess so as to define a space between said base plate and said pivotable arm, said second cylindrical recess being coaxial with said rotatable shaft, said pivotable arm having at a cylindrical surface defined by said second cylindrical recess a second ring gear;
   a third cylindrical recess which is formed on one of said base plate and said pivotable arm, said third cylindrical recess being merged with one of said first and second cylindrical recesses and being coaxial with said rotatable shaft;

a control gear securely and coaxially mounted on said rotatable shaft, said control gear being received in said space:

a planetary gear which has a toothed portion received in said space and a first boss portion formed on a rotational center thereof, said toothed portion being meshed with said first and second ring gears and said control gear, said first boss portion being received in said third cylindrical recess;

a supporting member for supporting said first boss portion of said planetary gear, said supporting member being received in said third cylindrical recess and being coaxial with said rotatable shaft, said supporting member having a circular center hole at a center thereof; and a second boss portion formed on one of said base plate and said pivotable arm, said second boss portion being disposed within said third cylindrical recess and being coaxial with said rotatable shaft, said second boss portion being received in said circular center hole of said supporting member for rotatably mounting said supporting member on said second boss portion.

8. A seat reclining mechanism as claimed in claim 7, in which said supporting member is sized so as to have a certain clearance between a cylindrical outer surface defined by said third cylindrical recess and a peripheral cylindrical surface of said supporting member.

9. A seat reclining mechanism as claimed in claim 7, in which said supporting member has a first circular hole for rotatably receiving therein said first boss portion of said planetary gear.

10. A seat reclining mechanism as claimed in claim 9, in which said supporting member has a second circular hole for rotatably receiving therein said first boss portion of said planetary gear, and in which said first and second circular holes are disposed on said supporting member such that a first distance between a rotational center of said supporting member and a rotational center of said first circular hole is shorter than a second distance between said rotational center of said supporting member and a rotational center of said second circular hole.

* * * * *